United States Patent [19]

Komatsu et al.

[11] Patent Number: 4,931,309
[45] Date of Patent: Jun. 5, 1990

[54] METHOD AND APPARATUS FOR PRODUCING MAGNETIC RECORDING MEDIUM

[75] Inventors: Kazunori Komatsu; Toshikazu Uetake, both of Kanagawa, Japan

[73] Assignee: Fuji Photo Film Co., Ltd., Kanagawa, Japan

[21] Appl. No.: 299,274

[22] Filed: Jan. 18, 1989

[30] Foreign Application Priority Data

Jan. 18, 1988 [JP] Japan ................................. 63-7047

[51] Int. Cl.$^5$ .............................................. B05D 3/14
[52] U.S. Cl. ........................................ 427/48; 118/67; 118/407; 118/620; 427/128
[58] Field of Search ............... 427/48, 128–132; 428/906, 694; 118/407, 620, 67

[56] References Cited

U.S. PATENT DOCUMENTS 3,627,580 12/1971 Krall ................................. 117/238
4,177,442 12/1979 Bate et al. ......................... 335/284
4,271,782 6/1981 Bate et al. ......................... 335/284

Primary Examiner—Bernard Pianalto
Attorney, Agent, or Firm—Sughrue, Mion, Zinn, Macpeak & Seas

[57] ABSTRACT

A method and apparatus for producing a magnetic medium having a uniform orientation of magnetic particles over the entire width of the medium. Correcting magnets are provided which produce a magnetic field which linearizes the main orienting magnetic field in regions where the main magnetic field diverges outwardly toward edge portions of the medium. The correcting magnets may be disposed along either a straight or curved line diverging outwardly from the edges of the support of the medium, or they may be disposed parallel to the edges of the medium and having a varying magnetic field strength in the downstream direction of the medium with respect to its direction of conveyance.

10 Claims, 3 Drawing Sheets

METHOD AND APPARATUS FOR PRODUCING MAGNETIC RECORDING MEDIUM

BACKGROUND OF THE INVENTION

The present invention generally relates to a method and apparatus for producing a magnetic recording medium, and particularly relates to a method and apparatus for producing an elongated belt-like magnetic recording medium such as a magnetic tape or the like.

For producing a magnetic recording medium such as a magnetic tape or the like, there is known a method including steps of continuously conveying an elongated nonmagnetic support in its lengthwise direction, coating the running support with a magnetic coating liquid in which ferromagnetic fine particles are dispersed in a binder using an organic solvent, drying the magnetic coating liquid, and cutting the thus-treated support into a desired shape.

In such a method for producing a magnetic recording medium as described above, the magnetic particles are oriented by means of a magnetic field during the running of the support for the purpose of improving the sensitivity and S/N (signal-to-noise) ratio of the magnetic recording medium. During this process, the magnetic particles (generally, acicular particles) in the magnetic coating liquid applied onto the support are oriented in the conveying direction of the support by means of a magnetic field applied in the support conveying direction before the magnetic coating liquid is dried or while the magnetic coating liquid is being dried so that the rectangular ratio (the ratio of residual flux density to saturation flux density) of the magnetic layer is increased. To produce the magnetic field in the support conveying direction for orienting the magnetic particles in the manner described above, a single or a plurality of electromagnets or permanent magnets are employed.

An example of a conventional magnetic orientation method used in producing magnetic tape is illustrated in FIGS. 5A and 5B, which show a plan view and a side view, respectively, of the region in which orientation is carried out. In this case, the orientation is performed by at least one pair of permanent magnets 5a disposed above and below a support 2 (which has been coated with a magnetic coating liquid) running in the direction of an arrow A in the drawing, with like poles of the two magnets being located opposite to each other with the tape interposed therebetween.

However, the lines $\underline{x}$ of magnetic force from the permanent magnets 5a are bent outward along the edge portions of the tape (see FIG. 5A), even if the length of the permanent magnets 5a is considerably longer than the width of the support 2. Hence, it is impossible to obtain a magnetic field perfectly parallel to the support conveying direction over the whole width of the support 2. That is, the magnetic particles in the coating liquid are oriented somewhat outward in the vicinity of the edge portions of the support 2 although they can be oriented perfectly in the support conveying direction in the vicinity of the center of the support 2. That is, measurements taken on samples of magnetic tape cut from edge portions of the tape show that the rectangular ratio is lower than that of tape samples cut from the vicinity of the central portion of the support 2. Thus, it is impossible to produce magnetic tapes which are equal in quality over the whole width of the support 2. It is a matter of course that the same problem is caused also in the case of using electromagnets.

SUMMARY OF THE INVENTION

The present invention has been attained in the foregoing circumstances, and an object thereof is to provide a method and apparatus for producing a magnetic recording medium in which a magnetic field which is parallel to the conveying direction of the support with less variations over the whole width of the support is applied to the support so that widthwise variations of the rectangular ratio are suppressed, and hence a high performance magnetic recording medium having an excellent orientation property can be efficiently produced.

More specifically, the above and other objects of the present invention can be achieved by a method for producing a magnetic recording medium comprising the steps of coating a continuously running elongated support with a magnetic liquid so as to form a magnetic layer on the support and applying a magnetic field to the magnetic layer so that the magnetic layer is oriented at least before the magnetic layer has been dried and hardened, in which, in accordance with the invention, correcting magnets are provided in the region of part of the magnetic field through which the support passes and in which the magnetic field has a tendency to spread in the transverse direction of the support toward the downstream side with respect to the running direction of the support, whereby the spreading of the magnetic field is reduced.

DESCRIPTION OF THE PREFERRED EMBODIMENTS

Preferred embodiments of the present invention illustrated in the accompanying drawings will be described hereunder in detail.

Figure 1:
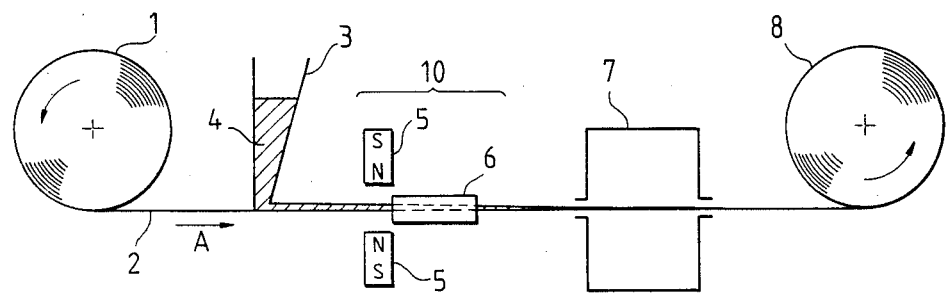
FIG. 1 is a schematic view for explaining a preferred embodiment of a method for producing magnetic recording media in accordance with the present invention.

FIG. 1 is a schematic view for explaining a process for producing a magnetic recording medium to which the method according to the present invention is applied. As shown in FIG. 1, an elongated belt-like nonmagnetic support 2 wound around a feed roll 1 is continuously conveyed in the direction of an arrow A so as to be wound around a take-up roll 8. A coating device 3 is disposed adjacent to the upper surface of the support 2 being conveyed so that the upper surface of the support 2 is uniformly coated with a magnetic coating liquid 4 by the coating device 3 so as to form a magnetic layer.

An orientation apparatus 10 constituted by main magnets 5 and correcting magnets 6 is disposed at the downstream side (with respect to the support conveying direction A) relative to the coating device 3. The main magnets 5 are constituted by two bar permanent magnets which are disposed above and below the support 2 with the N poles of the magnets 5 arranged opposite one another. As shown best in FIG. 2, the correcting magnets 6 are constituted by two bar-type permanent magnets disposed on the right and left sides of the support 2 downstream of the main magnets 5 with the correcting permanent magnets 6 slanting outward from the main magnets 5 in the downstream direction at a suitable angle $\theta$. The N poles of the correcting magnets 6 are also disposed opposite one another.

As a result, in the magnetic field at the downstream side of the main magnets 5, the spreading angle of the lines $\underline{x}$ of magnetic force in the running direction of the support in the vicinity of the edge portions thereof is reduced by the magnetic field of the correcting magnets 6. Hence, the lines $\underline{x}$ of magnetic force are parallel, even in regions somewhat separated from the main magnets 5, and therefore a stable magnetic field in the support running direction is applied to the support over the whole width of the support 2. The orientation of the magnetic particles is thus excellent.

Although the lines $\underline{x}$ of magnetic force spread inevitably in the support running direction in a downstream region where the magnetic field of the correcting magnets 6 has no influence, the magnetic force in this region is not sufficiently strong to affect the magnetic particle orientation, and therefore the spreading of the lines of magnetic force in such regions can be substantially disregarded.

The inclination angle $\theta$ of the correcting magnet 6 is not specifically limited, but can be suitably determined in accordance with various conditions such as the magnetic force of the main magnets 5, the magnetic force of the correcting magnets 6, the location of the correcting magnets 6, and the like.

After passing through a drying device 7 provided at the downstream side of the correcting magnets 6 so as to dry and harden the oriented magnetic layer, the support 2 is wound on the take-up roll 8.

Figure 2:
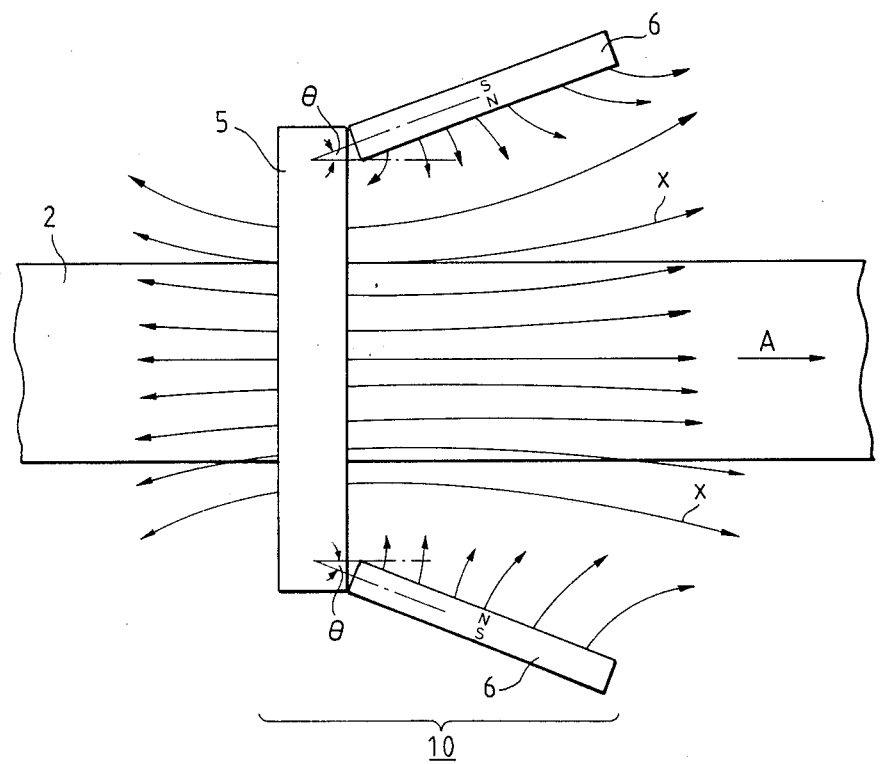
FIG. 2 is a plan view showing an orientation apparatus of FIG. 1.
Figure 3:
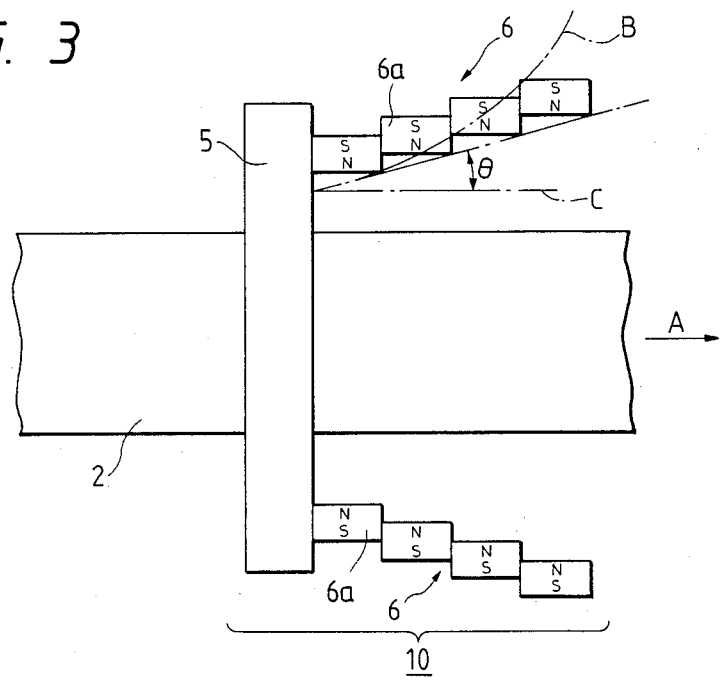
FIG. 3 is a plan view showing an orientation apparatus used in another embodiment of the method of the present invention.

Although the correcting magnets 6 are arranged so that only one magnet is provided on each of the right and left edges of the support 2 in the embodiment of FIG. 2, the present invention is not limited to this arrangement. For example, the correcting magnets 6 may be arranged so that a plurality of small magnets 6a are disposed on each side of the support 2, as shown in FIG. 3. In the case of FIG. 3, the small magnets 6a are disposed in a straight line so as to form a predetermined angle $\theta$ relative to the support running direction. Also, the small magnets may be arranged, for example, along a curve (as shown by a chain line B in FIG. 3) so as to more finely linearize the magnetic field in the edge regions of the support 2.

Although permanent magnets are used in the orientation apparatus 10 according to the present invention in the foregoing embodiments, it is a matter of course that substantially the same effect can be obtained with the use of electromagnets. Further, in the case where the small magnets 6a of the correcting magnets 6 of FIG. 3 are constituted by electromagnets, the small magnets 6a need not always be arranged along lines spreading outwardly in the support running direction, but they may be arranged along a line C in the drawing parallel to the edges of the support 2. That is, in this case, by properly controlling the currents in the respective small magnets 6a, it is possible to obtain the same effect as that in the case where the correcting magnets 6 are arranged along a line diverging outwardly in the support running direction.

As described above, in the method and apparatus according to the present invention, a support running in the fixed direction is coated with a magnetic coating liquid, and a stable magnetic field parallel to the running direction of the support over the whole width of the support is applied to the support by suppressing the degree of spreading of the lines of magnetic force at the downstream side of the main magnets by means of the correcting magnets provided at the downstream side of the main magnets. As a result, it is possible to prevent the reduction in rectangular ratio which would otherwise be caused at the edge portions of the support. Therefore, according to the present invention it is possible to produce a high-performance magnetic recording medium having a stable high rectangular ratio over the whole width of the medium.

In order to make the present invention more clear, a specific example of the present invention will be described hereunder.

Example

A support 2 of polyethylene terephthalate (PET) having a thickness of 14 $\mu$m and a width of 500 mm was coated with a liquid mixture of a coating composition set forth below determined such that the coating after drying had a thickness of 4 $\mu$m. At the downstream side of the coating position, the support 2 was subject to an orientation treatment in the support conveying direction by an orientation apparatus 10 constituted by main magnets 5 and correcting magnets 6 arranged as shown in FIGS. 1 and 2 and as discussed above. Thereafter, the support 2 was dried. The thus-obtained support 2 was cut into a plurality of magnetic tapes of a predetermined width.

The running speed of the support 2 was selected to be 200 m/min, and the strength of the magnetic field of the main magnets 5 (permanent magnets) was selected to be 3000 Oe (Oersteds). The strength of the magnetic field of the correction magnets 6 was selected to be 500 Oe, and the length of the correcting magnets 6 in the support running direction was 850 mm. The correcting magnets 6 were arranged as to define an inclination angle $\theta$ of 25° and to have a minimum distance of 200 mm from the edges of the support.

The composition of the magnetic coating liquid was as shown below. The acicular ratio of magnetic fine particles of the magnetic coating liquid was 7.

| | | |
|---|---|---|
| Fe$_2$O$_3$ containing Co | 100 weight | portions |
| nitrocellulose | 10 weight | portions |
| polyurethane (NIPPOLLAN 2304) | 8 weight | portions |
| polyisocyanate | 8 weight | portions |
| Cr$_3$O$_3$ | 2 weight | portions |
| Carbon | 2 weight | portions |
| stearic aicd | 1 weight | portion |
| butyl stearate | 1 weight | portion |
| methylethylketone | 300 weight | portions |

Comparative Example

Next, as a comparative example, a magnetic tape was produced under the condition that the correcting magnets 6 were removed, and an orientation treatment was performed by means of the magnetic field of only the main magnets 5.

Conditions except that mentioned above were the same as those in the above example of the invention.

Figure 4:
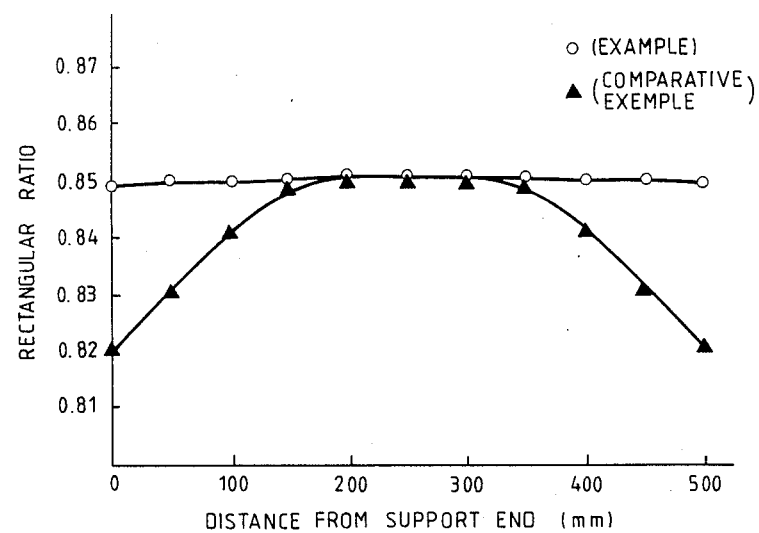
FIG. 4 is a graph showing a comparison in the rectangular ratio in the transverse direction between magnetic tapes produced in accordance with the present invention and in the conventional method.
Figure 5A:
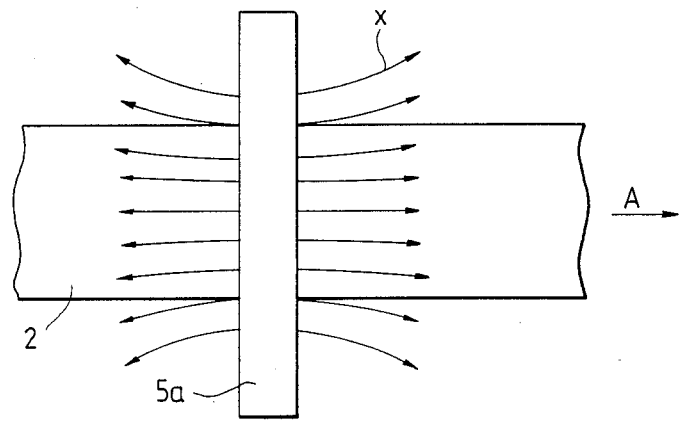
FIGS. 5A and 5B are schematic views for explaining the conventional magnetic tape orientation process.
Figure 5B:
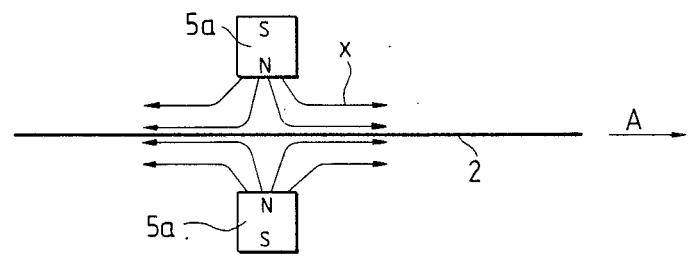

With respect to each of those magnetic tapes in the above example of the invention and the comparative example, the distribution of the rectangular ratio in the respective magnetic layers in the transverse direction of the support was measured. FIG. 4 shows the results of these measurements. As shown in FIG. 4, the distribution of the rectangular ratio is substantially flat over the width in the transverse direction in the example of the invention (indicated by circular marks in the drawing), while the distribution of the rectangular ratio falls at the opposite edge portions of the support in the comparative example (shown by triangular marks). Thus, the efficacy of the correcting magnets is clearly demonstrated.

As can be understood from the above results, the magnetic tape produced in accordance with the present invention is excellent in rectangular ratio over the whole width of the support and therefore excellent in magnetic characteristics such as sensitivity and signal-to-noise ratio.

What is claimed is:

1. A method for producing a magnetic recording medium comprising the steps of: coating a continuously running elongated support with a magnetic liquid so as to form a magnetic layer on said support; applying a main magnetic field to said magnetic layer so that said magnetic layer is oriented at least before said magnetic layer has been dried and hardened; and applying a correcting magnetic field in a region of a part of said main magnetic field and in which said main magnetic field spreads in a transverse direction of said support toward the downstream side with respect to the running direction of said support to thereby reduce the spread of said main magnetic field and linearize said main magnetic field across a width of said support.

2. The method for producing a magnetic recording medium according to claim 1, wherein said step of providing said correcting magnetic field comprises providing a plurality of correcting magnets, said correcting magnets being disposed so as to diverge outward from opposite edges of said support toward said downstream side with respect to said running direction of said support.

3. The method for producing a magnetic recording medium according to claim 2, wherein said correcting magnets are disposed along a straight line.

4. The method for producing a magnetic recording medium according to claim 2, wherein said correcting magnets are disposed along a curved line.

5. The method for producing a magnetic recording medium according to claim 1, wherein said step of providing said correcting magnetic field comprises providing a plurality of electromagnets disposed along a line parallel to edges of said medium for producing a magnetic field varying in a downstream direction with respect to said running direction of said support.

6. An apparatus for producing a magnetic recording medium comprising: means for coating a continuously running elongated support with a magnetic liquid so as to form a magnetic layer on said support; means for applying a main magnetic field to said magnetic layer so that said magnetic layer is oriented at least before said magnetic layer has been dried and hardened; and means for applying a correcting magnetic field in a region of a part of said main magnetic field and in which said main magnetic field spreads in a transverse direction of said support toward the downstream side with respect to the running direction of said support to thereby reduce the spread of said main magnetic field and linearize said main magnetic field across a width of said support.

7. The apparatus for producing a magnetic recording medium according to claim 6, wherein said means for providing said correcting magnetic field comprises providing a plurality of correcting magnets, said correcting magnets being disposed so as to diverge outward from opposite edges of said support toward said downstream side with respect to said running direction of said support.

8. The apparatus for producing a magnetic recording medium according to claim 7, wherein said correcting magnets are disposed along a straight line.

9. The apparatus for producing a magnetic recording medium according to claim 7, wherein said correcting magnets are disposed along a curved line.

10. The apparatus for producing a magnetic recording medium according to claim 6, wherein said means for providing said correcting magnetic field comprises a plurality of electromagnets disposed along a line parallel to edges of said medium for producing a magnetic field varying in a downstream direction with respect to said running direction of said support.

* * * * *